United States Patent
Mader

(10) Patent No.: US 9,422,109 B2
(45) Date of Patent: Aug. 23, 2016

(54) GRIPPER, CONVEYOR SYSTEM, AND METHOD FOR OPERATING SUCH A CONVEYOR SYSTEM

(75) Inventor: Carl Conrad Mader, Hittnau (CH)

(73) Assignee: FERAG AG, Hinwil (CH)

( * ) Notice: Subject to any disclaimer, the term of this patent is extended or adjusted under 35 U.S.C. 154(b) by 64 days.

(21) Appl. No.: 14/112,361

(22) PCT Filed: Apr. 20, 2012

(86) PCT No.: PCT/CH2012/000089
§ 371 (c)(1),
(2), (4) Date: Oct. 17, 2013

(87) PCT Pub. No.: WO2012/142719
PCT Pub. Date: Oct. 26, 2012

(65) Prior Publication Data
US 2014/0041994 A1   Feb. 13, 2014

(30) Foreign Application Priority Data

Apr. 21, 2011   (CH) .......................... 703/11

(51) Int. Cl.
| | | |
|---|---|---|
| *B65G 47/84* | (2006.01) | |
| *B65G 17/32* | (2006.01) | |
| *B29C 49/42* | (2006.01) | |
| *B65G 47/86* | (2006.01) | |
| *B65G 47/90* | (2006.01) | |
| *B65G 17/20* | (2006.01) | |

(52) U.S. Cl.
CPC .......... *B65G 17/323* (2013.01); *B29C 49/4205* (2013.01); *B65G 17/20* (2013.01); *B65G 47/842* (2013.01); *B65G 47/90* (2013.01); *B65G 47/908* (2013.01); *B65G 2201/0235* (2013.01)

(58) Field of Classification Search
CPC ............ B65G 17/323; B65G 2201/02; B65G 2201/0247; B65G 47/842; B65G 17/12; B65G 17/20
USPC .................. 198/468.2, 470.1, 471.1, 867.05, 198/867.06, 867.07, 803.7, 803.8, 803.9
See application file for complete search history.

(56) References Cited

U.S. PATENT DOCUMENTS

| 3,125,369 A | 3/1964 | Copping |
| 3,948,552 A * | 4/1976 | Hamrick ....................... 294/115 |

(Continued)

FOREIGN PATENT DOCUMENTS

| CH | 348623 | 10/1960 |
| DE | 9217202 | 4/1994 |

(Continued)

*Primary Examiner* — James R Bidwell
(74) *Attorney, Agent, or Firm* — Rankin, Hill & Clark LLP

(57) ABSTRACT

A gripper for grasping and conveying objects while retaining the objects, and to a corresponding conveyor system and an operating method. The gripper has a gripper body and first and second gripper jaws. The gripper jaws each include at least one respective clamping region, can assume an open state and a closed state relative to each other, and can exert a clamping force on each other or on the object to be grasped. At least one of the gripper jaws includes a jaw body that is elastically deformable and is supported on the gripper body such that the body assumes a defined spatial position (resting position) when force is not applied to a control element and deforms and is deflected from the resting position when force is applied to the control element.

28 Claims, 13 Drawing Sheets

(56) References Cited

U.S. PATENT DOCUMENTS

| | | | | |
|---|---|---|---|---|
| 4,681,213 | A | * | 7/1987 | Winiasz .................. 198/803.9 |
| 4,874,081 | A | * | 10/1989 | Kondo ..................... 198/803.9 |
| 5,419,427 | A | * | 5/1995 | Wurgler .................. 198/803.7 |
| 7,185,753 | B2 | * | 3/2007 | Hartness et al. .......... 198/474.1 |
| 8,602,471 | B2 | * | 12/2013 | Bodtlander et al. ....... 198/803.6 |
| 2006/0081445 | A1 | * | 4/2006 | Chung ..................... 198/803.7 |

FOREIGN PATENT DOCUMENTS

| | | |
|---|---|---|
| DE | 29602798 | 10/1996 |
| DE | 200 20 456 | 12/2001 |
| EP | 0999153 | 5/2000 |
| EP | 1262431 | 12/2002 |
| EP | 1790593 | 5/2007 |

* cited by examiner

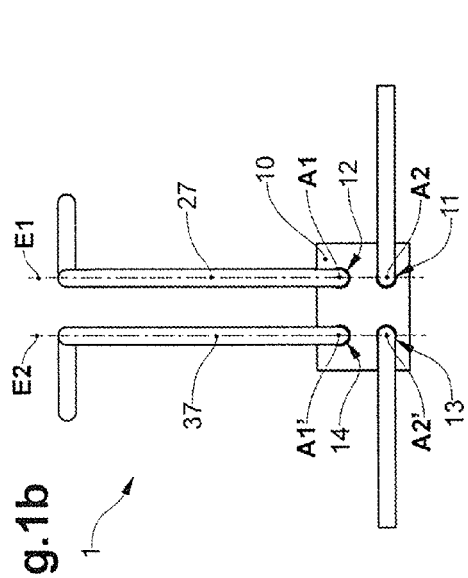
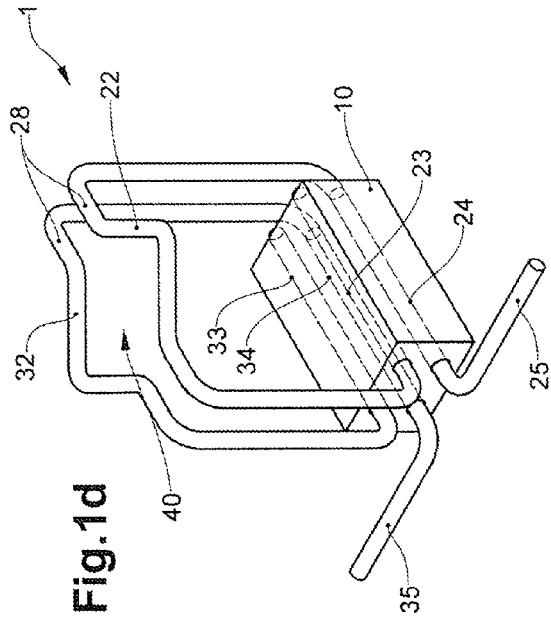
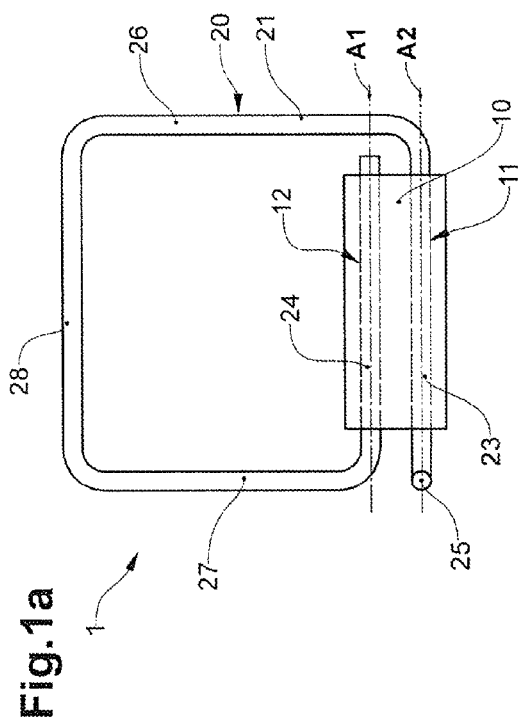

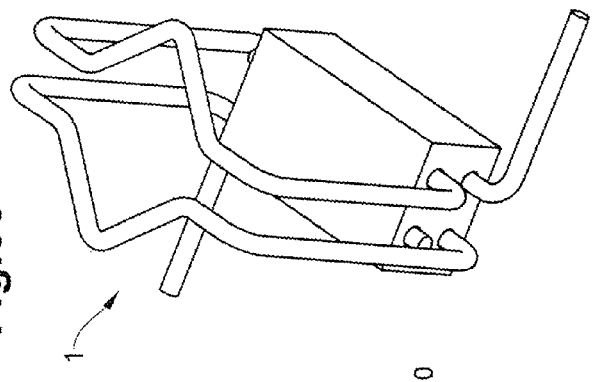
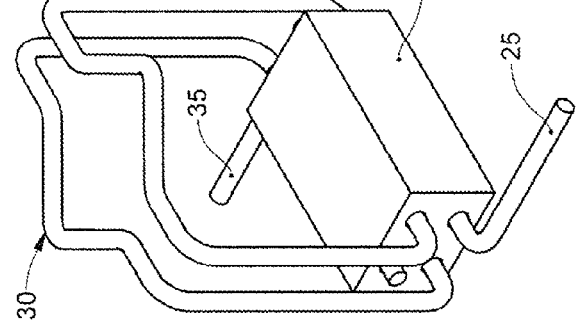
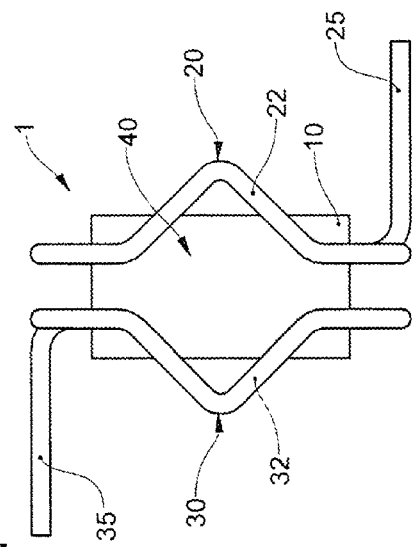
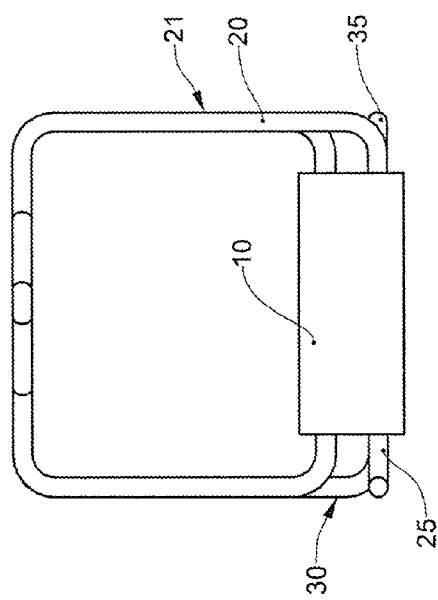
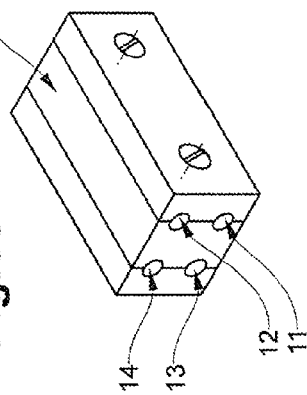

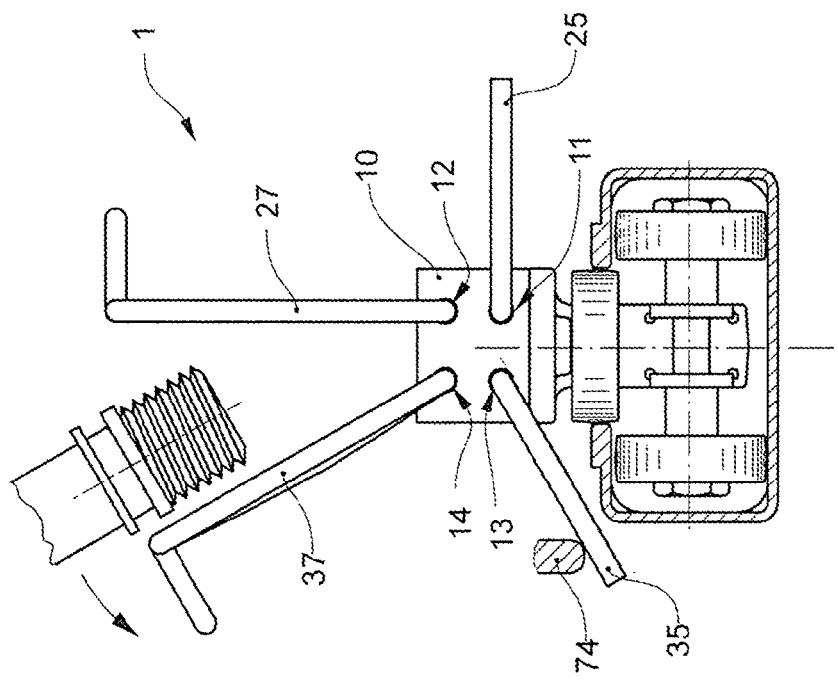
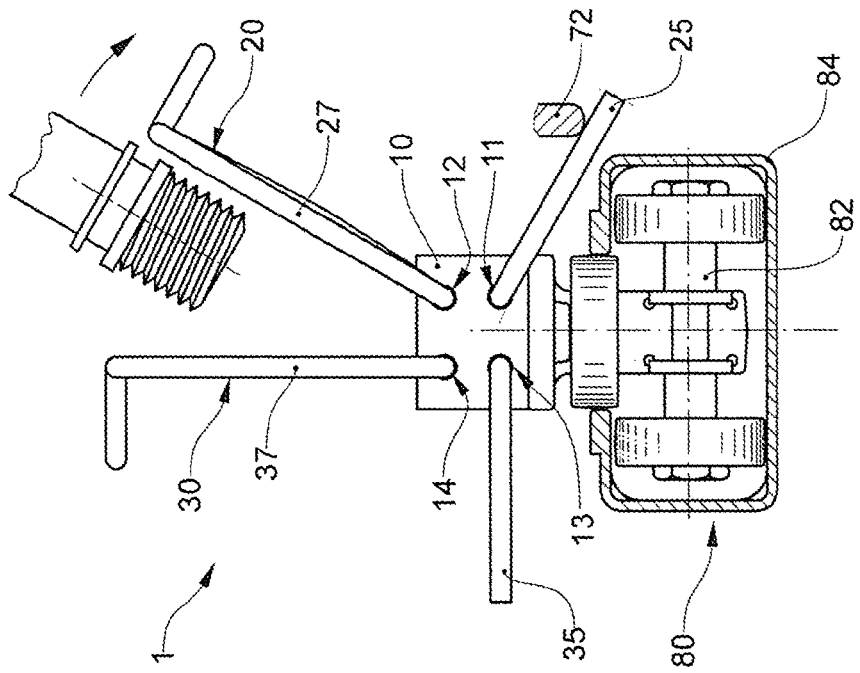
Fig. 7a
Fig. 7b

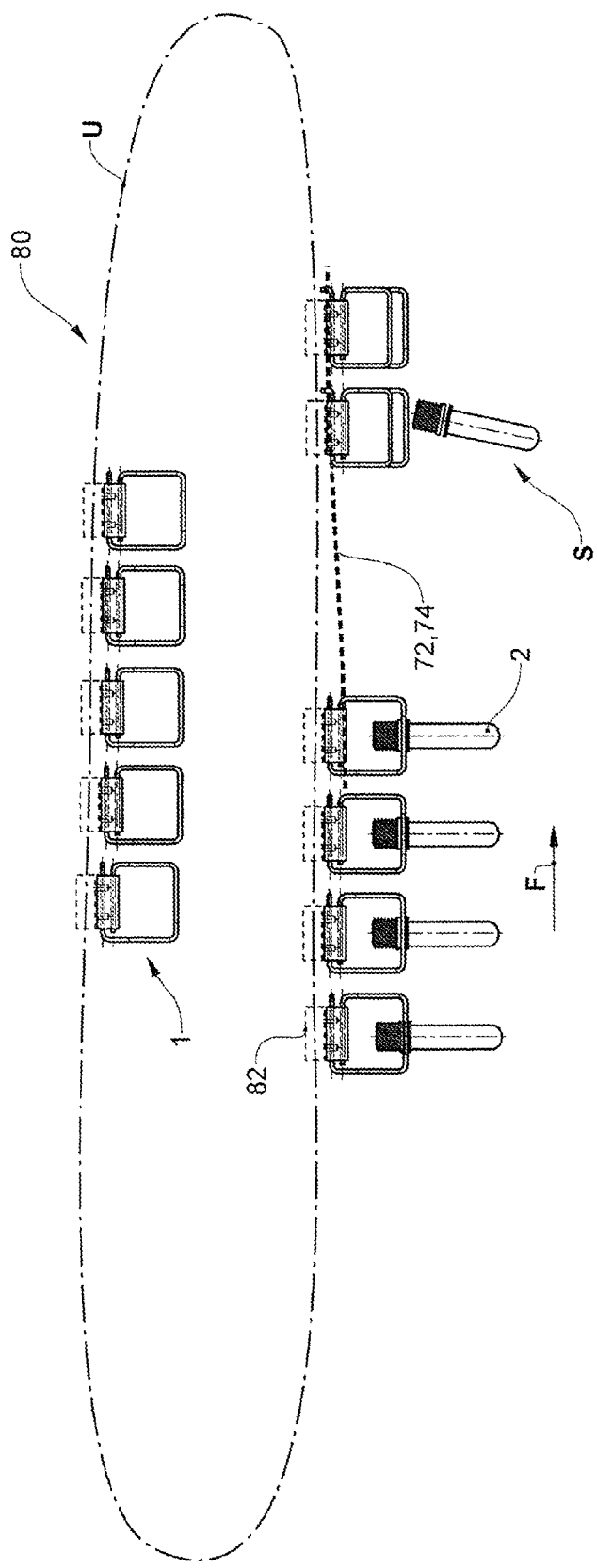

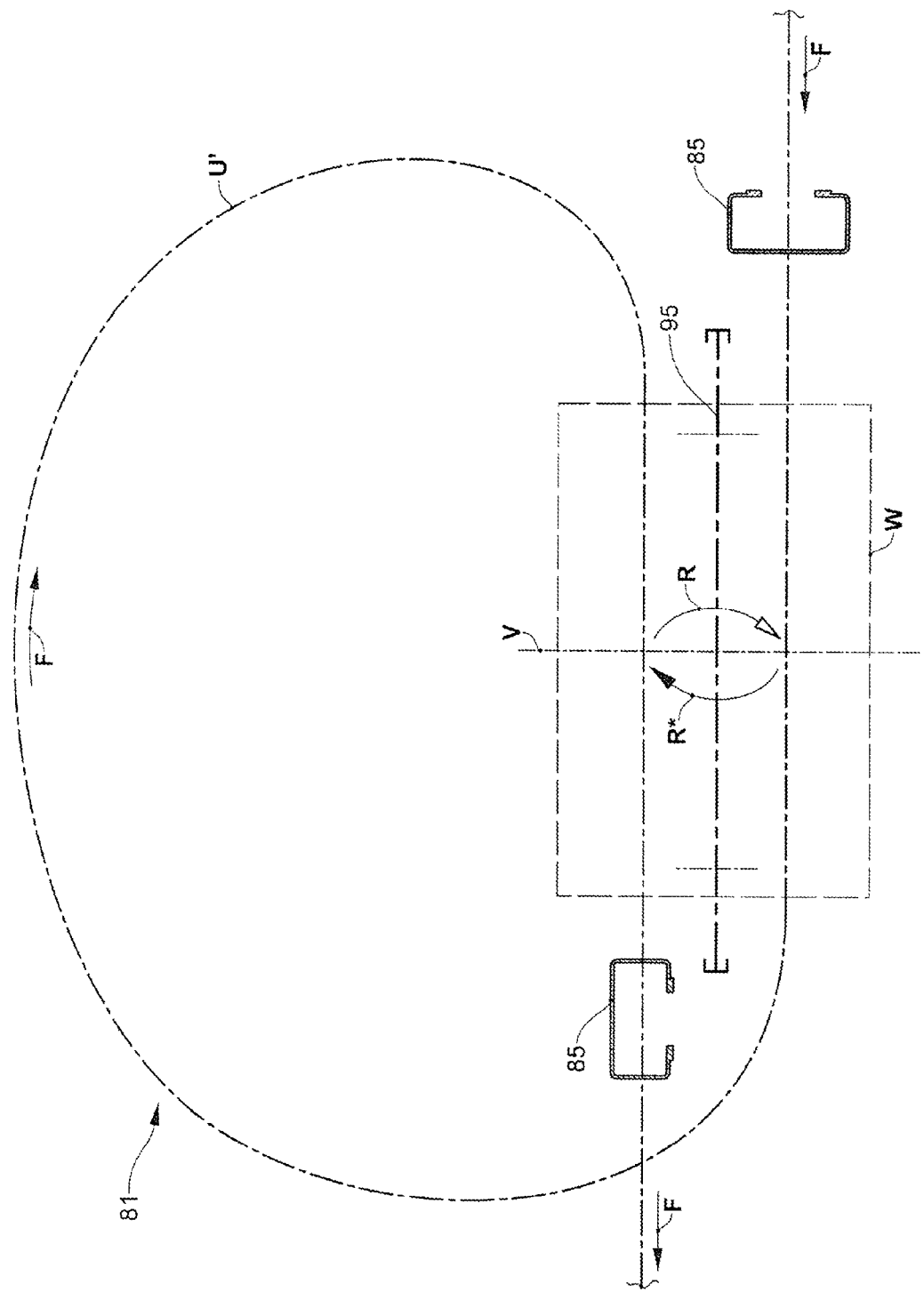

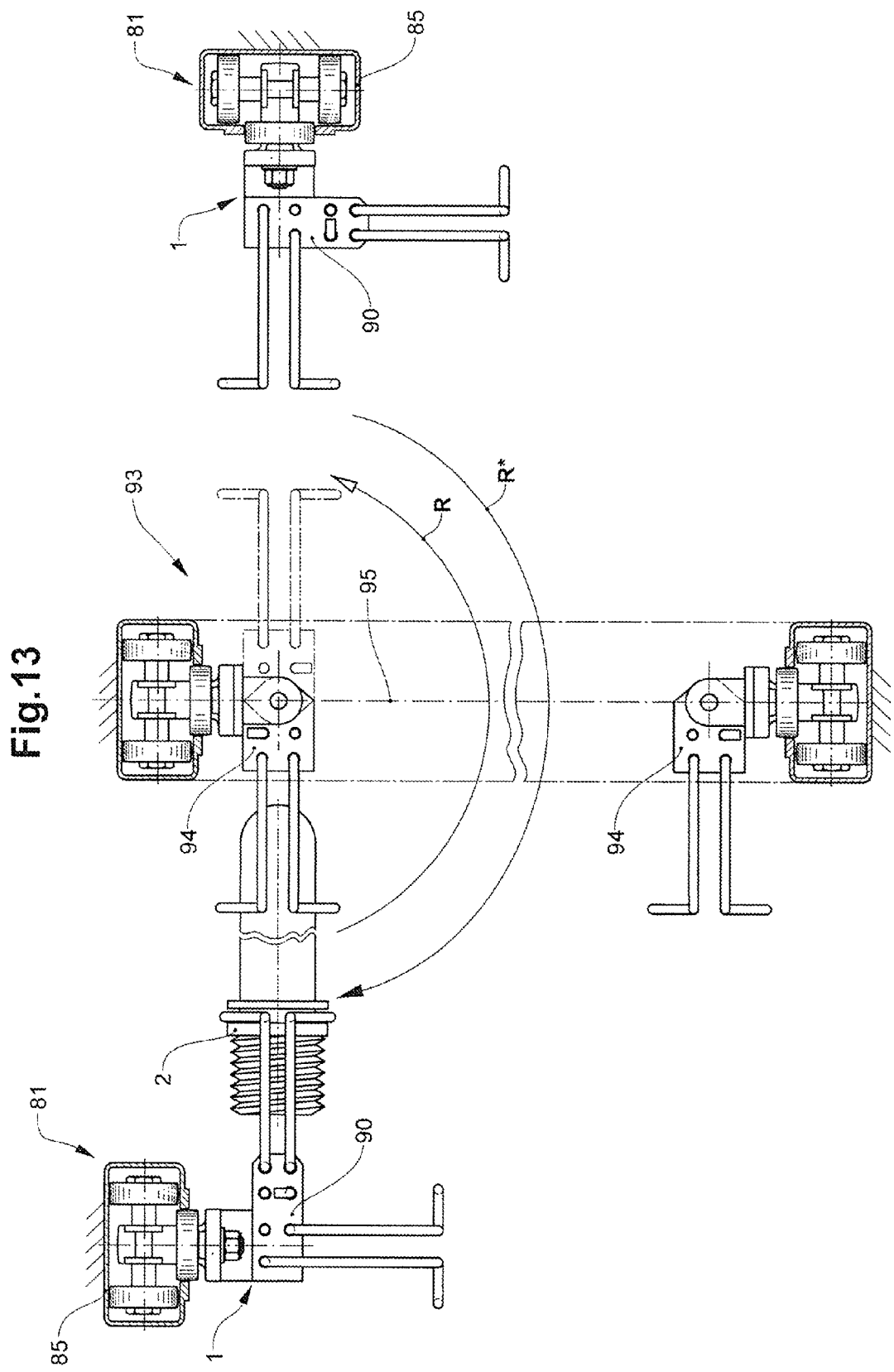

GRIPPER, CONVEYOR SYSTEM, AND METHOD FOR OPERATING SUCH A CONVEYOR SYSTEM

BACKGROUND OF THE INVENTION

1. Field of the Invention

The invention lies within the area of materials-handling technology. It relates to a gripper for grasping objects and conveying held objects, in particular spatially extended, symmetrical objects, objects with a retaining ring, hollow objects, objects with different forms and/or sizes. The gripper is suited in particular for grasping and conveying preforms for the production of vessels made of plastics material, for example PET bottles. The invention also relates to a conveyor system having such grippers and to a method for operating such a conveyor system.

2. Description of Related Art

In materials-handling technology, there is a need for grippers which are simple and cost-efficient to produce, are sturdy and flexible to use and are able to grasp and convey objects of different forms and quality in a reliable manner.

For example, grippers are used in order to convey preforms for the blow-molding of containers made of plastics material and to convey the produced containers between different stations of the blow-molding system. The preforms are hollow bodies which are made of a thermoplastic plastics material, are open on the one side and have a substantially rotationally-symmetrical form. As a rule, they have a thread and a retaining ring. Known grippers for preforms are developed in the manner of tongs. The gripper jaws are arranged in one plane which lies at right angles with respect to the rotational axis of the preform. They engage under the retaining ring in the manner of a fork by approaching from the side. Conveying apparatuses having such grippers consequently need a relatively large amount of space in the receiving region. In the region in which they grasp the object (clamping region) the gripper jaws are concave in form and are consequently adapted to the cylindrical form below the retaining ring. In this way, objects with different diameters are able to be grasped, however, only within certain maximum and minimum diameters. Examples of known preform grippers are described in US 2010/0278959, U.S. Pat. No. 6,612,634 or DE 10325693. Clamping mandrels which can be inserted into a mouth region of the preform for retention are used as an alternative to this.

U.S. Pat. No. 4,921,294 makes known a gripper for grasping flat products, in particular printed products, said gripper including a gripper body and a fixed and a movable gripper jaw. The design is mirror-symmetrical. The movable gripper jaw is formed by a mirror-symmetrical wire bow made of spring steel. The wire bow is formed in its end region in each case to form a helix. In addition, proceeding from the helices, it forms two holding tongues. These are oriented at right angles to the axis of the helices and are spaced apart from one another. Between the holding tongues the bow is curved such that it forms an elongated, straight bow part which is situated in the vicinity of the common axis of the helices and acts as a pressing element. The helices are placed onto journals which are arranged on opposite sides of the gripper body and coincide with one another. By the helices being fixed in the gripper body, the wire bow is prestressed against the fixed gripper jaw. The journal defines a pivot axis about which the gripper jaw is able to rotate. The gripper jaw is actuated by two control elements which press in each case onto the wire bow in the region of the holding tongue. Said control elements press the movable gripper jaw away from the fixed gripper jaw when they are actuated together. They are prestressed against the movable gripper jaw for this purpose.

Said design is adapted to flat objects as a result of the forming of the bow with two protruding tongues and one elongated pressing element. It is not suitable for conveying spatially extended objects with different forms. The actuating mechanism consists of several parts and is consequently expensive to produce and maintain.

BRIEF SUMMARY OF THE INVENTION

Consequently, the object underlying the invention is to provide a gripper, a corresponding conveying device and an operating method where the above-mentioned disadvantages of the prior art are avoided. The gripper is, in particular, to be suited for grasping and conveying spatially extended objects with different forms, e.g. preforms, in a reliable manner. The gripper is to be producible in a simple and cost-efficient manner and is to be as sturdy as possible.

The object is achieved by a gripper with the features of claim 1, by a conveyor system having such grippers as claimed in claim 17 and by an operating method for such a conveyor system as claimed in claim 20. The dependent claims, the description and the drawings provide advantageous further developments of the invention.

The gripper as claimed in the invention includes a gripper body, a first gripper jaw and a second gripper jaw. The gripper jaws comprise in each case at least one clamping region in which, in use, they interact with the object. They are able to assume an open and a closed state in relation to one another and are able to exert a clamping force onto the object to be grasped for retention. At least one control element is present which is capable of interacting with a control link, and acts at least indirectly on one of the gripper jaws in order to move the same. At least one of the gripper jaws includes a jaw body which is elastically deformable and is mounted on the gripper body such that without force acting on the control element the jaw body assumes a defined spatial position and when force does act on the control element it deforms elastically. Through the suitable bearing arrangement in the gripper body, the jaw body is preferably not only deformed along one line but over its entire extension. As a result of the elastic deforming the gripper jaw is deflected out of the defined position, and the gripper is opened or closed. The gripper holds the object in a form-fitting manner, force-fitting manner and/or friction-fitting manner.

Clamping force refers to a force by way of which the gripper jaws act on an object which is grasped by said gripper jaws, i.e. by way of which force the grippers grasp the object grasped therein. If no object is grasped, in a closed state the gripper jaws can exert a clamping force on one another. In particular, in the closed state, gripper jaws do not exert any clamping force on one another when they are not grasping an object.

The jaw body is preferably mounted on the gripper body at at least three points, which do not lie along one common axis, or at at least two different axes. The axes are, for example, parallel or skew in relation to one another. The achievement here is that the gripper jaw is moved in relation to the other gripper jaw when the control element is actuated such that the gripper for example opens or closes. The gripper jaw, consequently, does not make a precise pivot movement about a clearly defined pivot axis, but rather a movement which can be approximated by a pivot movement about an axis (in the following: movement about an approximate pivot axis).

Under load, for example when a torque is transferred onto the jaw body by the control element, the jaw body is rotated at least in individual portions (torsion). By means of the above-described bearing arrangement along two axes or at at least three points, the jaw body cannot execute a pure torsional movement, but is loaded at least in regions also by flexion. As a result, relatively large amounts of elastic energy can be stored in a simple mechanical element, for example an asymmetrical loop-like wire bow. These also result in large restoring forces and consequently in a good holding action even in said very simple design.

The asymmetrical bearing arrangement and the one-sided actuation result in the wire bow, when viewed transversely with respect to the approximate pivot axis, being opened in a non-uniform manner, i.e. more on the side of the control element than on the side spaced apart from the control element. Said effect can be utilized when objects are to be received in the direction of the approximate pivot axis by the gripper approaching the object with the side which is somewhat more open in front.

The jaw body preferably includes an elastically deformable material, in particular a spring steel wire. It can be realized as a single part or as multiple parts and can consist of one or several materials.

The jaw body is preferably a bow made of a wire-shaped or tubular material, e.g. metal or plastics material, with a round, rectangular, square or otherwise formed cross section. Elements, the length of which in the extended state is many times greater than their thickness or their diameter, are designated as "wire-shaped or tubular" (simply called "wire bow" below). Such a gripper jaw can be produced in a simple and cost-efficient manner. The functions which are important for the gripper, such as the bearing arrangement in the gripper body, the elastic deforming when opening and closing and the fixing/clamping of objects, are realized in one common component part by means of the wire bow. The wire bow can also consist of several connected parts to simplify production. The diameter or the thickness of the wire material is selected such that the jaw body is sufficiently sturdy to retain the desired objects and sufficiently elastic to open and close by means of elastic deformation. Typically, the diameter of the wire material is within the range of between 1 and 20 mm and is preferably between 3 and 8 mm. In particular, the diameter of the wire material is within the range of between 1 and 10 mm and is preferably between 1.1 and 3.5 mm.

The bow preferably has the form of a loop which lies substantially in one plane. The ends of the loop are preferably situated in the spatial proximity of one another. Part of the bow is formed such that it forms a clamping region. The clamping region is preferably formed such that in the closed state together with the further gripper jaw a receiving means with a defined minimum size is formed. For this purpose the clamping region projects preferably in an arcuate manner out of the plane of the loop and has a contour which tapers as the distance from the plane increases, in particular a crescent-shaped, triangular or polygonal contour.

The tapering shape serves for receiving objects with different sizes and forms in more secure manner. The objects force the gripper to open the gripper jaws in a variously wide manner, but they are held securely irrespective of the degree of opening as the clamping region presses on the object from several sides by means of the outwardly tapering contour.

As an alternative to the tapering contour or in addition to it, the clamping region can comprise elastically deformable clamping elements with have a greater degree of elasticity than the jaw bodies which hold the object on several sides when receiving it. The clamping element is, for example, an elastic element, for example a rubber strip or a helical spring which is positioned inside the clamping region and, where applicable, is clamped between the wire bow which is curved there in a protruding manner. The range of use of the gripper is increased further when said clamping elements are exchangeable such that, depending on the requirements, different elasticities and clamping forces are able to be realized.

The bow comprises at least two fastening portions which are spaced apart from one another and by way of which sad bow is mounted in or on bearing regions of the gripper body. The bearing regions and consequently the fastening portions are aligned in the gripper body preferably along different axes which preferably extend in parallel. The bearing regions are, for example, holes and/or continuous recesses in the gripper body, into which the end regions of the bow are inserted and the bow is consequently able to be clamped therewith. The clamping region is situated, in particular when viewed along the wire, between the fastening portions. The achievement of said bearing arrangement is that the bow is deformed substantially along its entire extension when it is deflected at one position by introducing force locally. The gripper is consequently opened or closed even when a force is exerted in a point-focal manner only at one position.

The development of a control element which interacts with an external control link is particularly simple in the case of the above-described bow. For this purpose, in an end region the bow preferably comprises an actuating portion which is capable of interacting directly with a mechanical control link or serves as a support of a control roller which, in turn, rolls off the control link. For this purpose, the actuating portion is preferably bent in relation to the adjoining fastening portion and preferably points in a direction which is at right angles on the approximate pivot axis of the gripper jaw. A torque is able to be transmitted onto the bow in a particularly good manner by means of the lever which is formed in this way.

As an alternative to the bow form, the jaw body can also be a flat element which is elastically deformable per se, for example a spring steel plate which is clamped in the gripper body and realizes a suitably formed clamping region.

The gripper preferably has two substantially identically constructed gripper jaws which are individually controllable. The gripper jaws are arranged on the gripper body so as to be mirror-symmetrical or axially symmetrical in relation to one another. By opening the one or the other gripper jaw in a targeted manner or by moving the two gripper jaws in common, it is possible to influence the direction in which the grasped objects are discharged, in particular when the gripper body, when viewed in the direction of the gravitational force, is situated below the object when the objects are discharged. Through the directed discharge, the overall system obtains a new degree of freedom in spite of the markedly simple design of the grippers. The control elements for the two gripper jaws are preferably situated on different sides of the gripper body, which simplifies the arrangement of the respective control links.

In operation the grippers can be situated above, below or next to the received objects. The objects are grasped from above or from below or by the gripper approaching the object from the side along the direction of the approximate pivot axis.

Without force being introduced onto the control element, the gripper jaws assume, for example, the following positions: lying side by side in the clamping region (also with prestressing); at a small spacing in the clamping region; at a maximum opening spacing in the clamping region. In the first two cases the gripper jaws are activated for opening and surround the objects from the outside. In the last case, the gripper jaws are activated for closing and grasp the objects by moving in the closed state into a recess in the object and securing the same from the inside.

In a further advantageous development, the gripper opens automatically. One or both gripper jaws are opened when an object presses laterally, i.e. in the direction of the approximate pivot axis, against the gripper jaws. The gripper jaws are deflected such that the object is able to be inserted between them. As soon as the object is situated in the receiving means, the gripper jaws are moved toward one another again on account of their elasticity and encompass the object in a clamping manner. For this purpose, the gripper jaws preferably comprise further actuating elements or are coupled with such actuating elements. The further actuating elements are formed such that the gripper jaws deflect outwards when an object is moved against the actuating elements in the direction of the approximate pivot axis which, as a rule, also corresponds to the conveying direction.

As an optional feature, the gripper comprises at least two first gripper jaws and at least two second gripper jaws. In this case, each first gripper jaw is able to assume an open and a closed state in relation to at least one second gripper jaw and is able to exert a clamping force onto the object to be grasped and/or also in reverse each second gripper jaw is able to assume an open and a closed state in relation to at least one first gripper jaw and is able to exert a clamping force onto the object to be grasped.

This means, for example, that each first gripper jaw is realized and arranged in such a manner that it is able to assume an open and a closed state in relation to at least one second gripper jaw and exerts a clamping force onto a grasped object and/or also in reverse each second gripper jaw is realized and arranged in such a manner that it is able to assume an open and a closed state in relation to at least one first gripper jaw and exerts a clamping force onto a grasped object.

By means of a plurality of first and second gripper jaws, several objects can be grasped at the same time per gripper. This results in an increase in the conveying capacity of the gripper and/or in other process engineering advantages, such as, for instance, the possibility of being used independently from one another and/or of the several first and second gripper jaws being equipped differently from one another with different objects and/or of different objects being conveyed at the same time over different distances in space and/or time.

As an option, in each case one gripper jaw is able to assume an open and/or a closed state in relation to several other gripper jaws and is able to exert a clamping force onto the object to be grasped or the objects to be grasped.

As a further optional feature, in the case of a gripper with at least two first and at least two second gripper jaws, each first gripper jaw is able to assume an open and a closed state in relation to one single second gripper jaw and is able to exert a clamping force onto the object to be grasped, and at the same time each second gripper jaw is able to assume an open and a closed state in relation to one single first gripper jaw and is able to exert a clamping force onto the object to be grasped.

In this case, proceeding from a gripper with a plurality of gripper jaws, each individual gripper jaw therefore comprises only one single further gripper jaw, with reference to which it is able to assume an open and a close state and by means of which it exerts a clamping force onto the object to be grasped. The gripper consequently has at least two separate pairs of gripper jaws. A plurality of pairs of gripper jaws allows for versatile use of the gripper and increases the conveying capacity of the gripper. The advantages of a plurality of gripper jaws mentioned further above apply equally to a gripper with a plurality of pairs of gripper jaws.

As an alternative to this, different numbers of gripper jaws can also interact (that is assume an open and a closed state in relation to one another and exert a clamping force onto the object to be grasped). For example, two or even more first gripper jaws can interact with only one second gripper jaw. In reverse, one first gripper jaw can interact, for example, also with two or more second gripper jaws. The same applies to the second gripper jaws as with reference to the first gripper jaws.

As a further optional feature, a gripper, where several first gripper jaws are deflected by one common control element and/or several second gripper jaws are deflected by one different, common control element, comprises a number of control elements which is greater than or equal to the number of the first gripper jaws and/or greater than or equal to the number of second gripper jaws.

A number of control elements, which is at least the same size as or greater than the number of first and/or of second gripper jaws, allows for flexible control of individual gripper jaws and increases the flexibility and versatility of the possibilities for use of the gripper. As an alternative to this, a smaller number of control elements can also be used. In this case, several gripper jaws can be controlled by one single control element and/or gripper jaws are not controlled by control elements at all, but, for example, are operated so as to open automatically.

As a further optional feature, in the closed state, a first pair of gripper jaws is at an angle of between 40 and 140 degrees, in particular of between 60 and 120 degrees and in particular of between 80 and 100 degrees with respect to a second pair of gripper jaws. In this case, one pair of gripper jaws includes a first gripper jaw and a second gripper jaw which are able to exert a clamping force onto the object to be grasped.

In other words, one pair of gripper jaws includes a first gripper jaw and a second gripper jaw which are developed and set up in such a manner to exert a clamping force onto the object to be grasped. The gripper jaws of one pair of gripper jaws interact together. In the closed state, a first and a second pair of gripper jaws are at an angle of between 40 and 140 degrees with respect to one another. The angle can be, in particular, between 60 and 120 degrees. The angle can, in particular, also be between 80 and 100 degrees. In particular, the first and the second pair of gripper jaws are at right angles to one another. The angle between the pairs of gripper jaws in the closed state corresponds, for example, to the angle between the longitudinal center axes of the objects which are grasped by said pairs of gripper jaws.

An arrangement of pairs of gripper jaws which are angled with respect to one another (in the closed state) allows for simple and rapid access to the gripper from different spatial directions. This can simplify or accelerate the process of the gripper grasping and/or discharging the objects. The possibilities for use of the gripper are also increased as a result. However, as an alternative to this, the pairs of gripper jaws can also be at angles of less than 40 degrees and/or greater than 140 degrees with respect to one another. In particular as an alternative, it is possible for the pairs of gripper jaws also to be parallel to one another.

The conveyor system as claimed in the invention includes a drive member which is movable along a closed circular path and a plurality of grippers which are coupled on the drive member or are couplable thereon. The drive member is for example a continuous conveying member which is moved in a guide, for example a chain in a channel, in particular in a guide channel. As an alternative to this, the drive member can also be realized by a rotational body or by individual carriages.

As an optional feature, the abovementioned conveyor system additionally includes a transferring mechanism. The transferring mechanism is able to transfer a grasped object from a first gripper of the conveyor system into a second gripper of the conveyor system. In this case, in particular the grasped object is transferred out of a first position with reference to the first gripper into a second position with reference to the second gripper and the first and the second position differ with reference to the respective gripper in contact points with the gripper, the position of the object with reference to the gripper and/or the orientation of the object with reference to the gripper.

The transferring mechanism allows a grasped object to be transferred from a first gripper into a second gripper on the same circular path in the same conveyor system. By transferring grasped objects, the grasped objects, when running once through the closed circumferential path, are able to jump parts of the closed circular path and/or run through them multiple times and/or in particular run through them several times in a selective manner. This increases the possibilities of use for the conveyor system and makes it more flexible. As an alternative to this, it is possible to dispense with a transferring mechanism. As an alternative, the grasped objects can also be transferred without a transferring mechanism. It is also possible to dispense with transferring the grasped objects.

The fact that a first and a second position of the grasped object with reference to the respective gripper differ from one another prior to and after the transferring within the same conveying system, allows for an even more flexible and more versatile use of the conveyor system. The difference between the first and the second position can lie in the contact points between the object and the gripper, the position of the object with reference to the gripper and/or the orientation of the object with reference to the gripper. By means of different contact points, a different position and/or a different orientation, the grasped object can be worked on in a different manner and/or the grasped object can be worked on from different spatial directions. In particular in combination with the possibility of jumping parts of the closed circular path and/or of running through them multiple times in a selective manner, the possibilities for use and the flexibility of the conveyor system are increased. As an alternative to this, the positions of the grasped objects can also be identical with reference to the respective gripper prior to and after the transferring process.

In the case of the conveyor system, grippers are preferably used which comprise one single controllable first gripper jaw and one substantially identically constructed second gripper jaw and first and second control elements which are associated therewith. The system also has first and second control links which interact with the first or second control elements for the targeted opening of the first and/or second gripper jaw. The control links can be arranged at different opening positions along the circular path or also at identical ones in order to open the gripper or an individual gripper there in a targeted manner.

There is preferably an opening position at which a first and a second control link are arranged. The control links are able to be activated and deactivated by a control device in order to open the first or the second gripper jaw in a selective manner. As a result, the direction into which the object is discharged is able to be influenced.

The grippers are fastened on the drive member such that they receive the objects preferably substantially from above, i.e. the grippers are suspended from the drive member. The opened gripper jaw preferably points downward in the vertical direction when receiving and the object can be inserted there between. The objects can consequently be arranged in an upright manner at the receiving position and the conveyor system can be situated above instead of next to the receiving position. As a result, space is saved in the lateral direction. The grippers can assume other orientations in other regions of the path.

The invention is suited in particular for grasping, conveying and releasing spatially extended objects of almost arbitrary form. It is suited above all to symmetrical objects and/or such objects with a retaining ring and/or objects with a hollow form. A preferred application is the conveying of preforms for the blow-molding of containers made of plastics materials, in particular PET bottles. Objects with different forms and/or sizes in the region to be grasped can be conveyed by means of structurally identical grippers. As a result of the high degree of adaptability of the grippers, it is also possible to have a mixed operation where different objects are conveyed in the conveyor system at the same time. By means of grippers with two structurally identical, individually activatable gripper jaws, the objects can be discharged in a targeted manner in different directions and consequently can be supplied to different further processing stations.

It is possible to sort the objects by means of the targeted product discharge. In dependence on pre-determined features, such as, for example, the size, the objects, when viewed in the conveying direction, can be discharged to the right or to the left and can be supplied to different further stations or conveying paths. Said sorting function is realizable with simple means.

As an option, a conveyor system as described above can be operated by a method in which in a first step an object to be grasped is grasped by a first gripper of the conveyor system. In a second step the grasped object is transferred from the first gripper of the conveyor system to a second gripper of the conveyor system and in a third step the grasped object is discharged from the second gripper of the conveyor system.

As an additional option, in the second step of the above-described method, the grasped object is transferred from a first position with reference to the first gripper into a second position with reference to the second gripper, the first and the second position differing with reference to the respective gripper in the contact points with the gripper and/or the position of the object with reference to the gripper and/or the orientation of the object with reference to the gripper.

The advantages and alternatives of a conveyor system which is operated by means of a method which includes the three steps described above have already been described further above for the description of the transferring mechanism. The same applies to the advantages and alternatives of differing positions of the grasped objects with reference to the corresponding gripper prior to and after the second step (therefore prior to and after the transferring process). As an option in this case, an object which has been grasped after the second step of the method runs through, at least in part, an identical portion of the closed circular path of the conveyor system as the same object grasped prior to the second step of the method. In other words, the same object, grasped by the second gripper, runs through, at least in part, the same circular path which it has already run through grasped by the first gripper.

The advantages of parts of the closed circular path which are run through multiple times and in particular are run through multiple times in a selective manner have also already been described further above. As an alternative to this, parts of the circular path can also be jumped, that is left out or shortened. In particular, switched-off processing stations can be by-passed or corresponding parts of the circular path can be bridged in this way. The identical circular path of the conveyor system can consequently be used and operated in a considerably more versatile, more flexible and also more effective and more cost-efficient manner.

BRIEF DESCRIPTION OF THE DRAWINGS

Examples of the invention are shown in the figures and are described below, in which, in a purely schematic manner.

FIG. 1a is an elevation view showing a gripper with two gripper jaws in the form of bows;

FIG. 1b is an elevation view showing a gripper with two gripper jaws in the form of bows;

FIG. 1c is a perspective view showing a gripper with two gripper jaws in the form of bows;

FIG. 1d is a perspective view showing a gripper with two gripper jaws in the form of bows;

FIG. 3a is an elevation view of an alternative gripper with two gripper jaws in the form of bows;

FIG. 3b is a perspective view of an alternative gripper with two gripper jaws in the form of bows;

FIG. 3c is a perspective view of an alternative gripper with two gripper jaws in the form of bows;

FIG. 3d is a plan view of an alternative gripper with two gripper jaws in the form of bows;

FIG. 3e is a perspective view of an alternative gripper with two gripper jaws in the form of bows;

FIGS. 7a-7b are elevation views that show a gripper when discharging an object by selectively opening a first or a second gripper jaw;

FIG. 8 is a plan view that shows a conveyor system;

FIG. 12 is a plan view that shows part of the circular path of the conveyor system from FIG. 9; and FIG. 13 is an elevation view that shows a cross section through the circular path of the conveyor system from FIG. 12.

DETAILED DESCRIPTION OF THE INVENTION

Figure 2A:
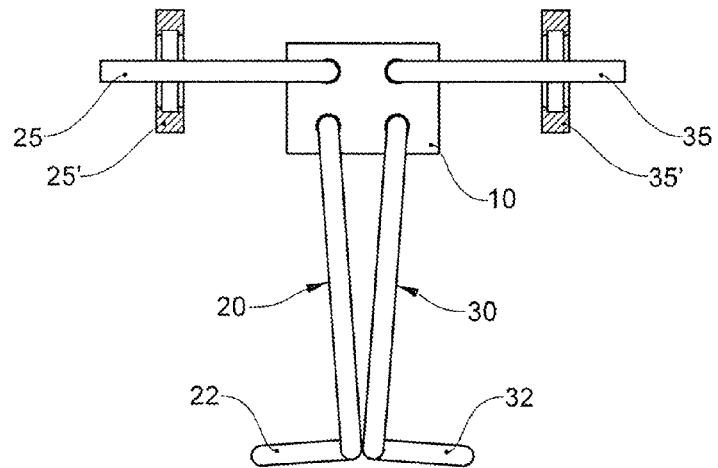
FIGS. 2a-2c are elevations views that show the gripper from FIGS. 1a-1d in a closed state and in a state open on one side and on two sides.

FIGS. 1a-d show various views of a gripper 1 with a gripper body 10 and two gripper jaws 20, 30 in the form of bows 21, 31 in the closed state.

The gripper body 10 is substantially square and comprises four tubular recesses 11, 12, 13, 14 which are continuous in its longitudinal direction. It can, as shown in FIG. 3e, consist of several interconnected parts, the recesses being formed by grooves along the connecting faces of said parts. Two each of the recesses 11, 12 or 13, 14 lie in common plane E1 or E2 and extend parallel to one another. The gripper body 10 includes additional elements (not shown here) by way of which it is able to be coupled to a drive member of a conveyor system.

The gripper jaws 20, 30 are in the form of a loop which, from the side view (FIG. 1 a) is substantially rectangular and comprises two fastening portions 23, 24 or 33, 34 which extend parallel to one another and lie next to one another. The bow 21, 31 is mounted in the recesses 11, 12 or 13, 14 in the gripper body 10 by way of said fastening portions 23, 24 or 33, 34. Each of the fastening portions 23, 24, 33, 34 merges into a portion 26, 27 or 36, 37 which is oriented approximately at right angles thereto. Said portions are connected together by means of a further portion 28, 38 which again extends approximately parallel to the fastening portions of the corresponding bow 21, 31. The clamping region 22, 32 is situated inside the further portion 28, 38. Whereas the portions 23, 24, 26, 27 or 33, 34, 36, 37 are oriented substantially in the plane E1 or E2, the clamping regions 22, 32 are oriented at right angles to said planes. As a result, together they form a recess 40 in which an object is able to be received and held, for example by engaging under a retaining ring or a stop. In the present example, the clamping regions 22, 32 are formed by the bow 21, 31 projecting out of the plane E1 or E2 in the manner of a triangle such that the recess 40 tapers outwards.

The bows 21, 31 also have in an end region an actuating portion 25, 35 which projects out of the plane E1 or E2. The actuating portion 25, 35 interacts as a control element directly with a control link or supports a control roller 25', 35' (FIG. 2a) which rolls off on such a control link. In this example, the actuating portions 25, 35 of the two gripper jaws 20, 30 are arranged on the same side of the gripper body 10, but point in opposite directions (mirror-symmetrical design). In the example of FIGS. 3a-e they are located on opposite sides of the gripper body 10 (axially-symmetrical design).

Figure 2B:
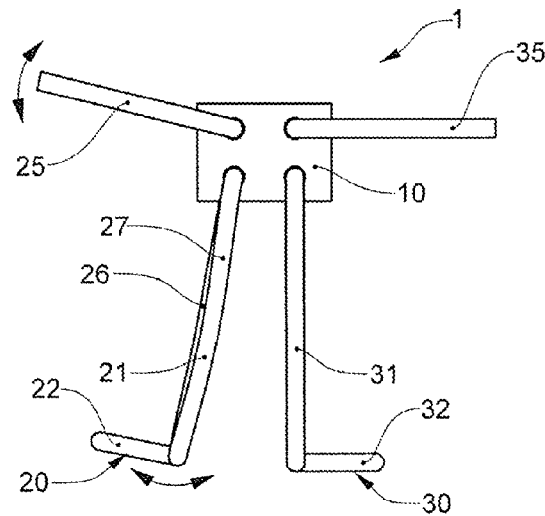
Figure 2C:
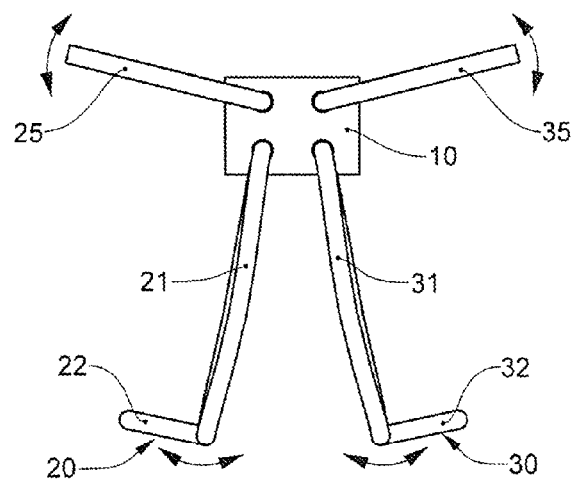

The gripper 1 functions as follows. The fastening portions 23, 24 or 33, 34 are situated in the recesses 11, 12 or 13, 14 in the gripper body 10. As a result, the bows 21, 31 assume the rest position shown in FIGS. 1b-d in which they are located in parallel planes E1, E2. Prestressing or preforming the bows in a suitable manner can also achieve that the bows press against one another in the non-loaded state (without the control element being actuated), as shown in FIG. 2a. The fastening portions 23, 24 or 33, 34 of a bow 21, 31 are not mounted along one common axis, but in each along two preferably parallel axes A1, A2, A1', A2' which are predetermined in each case by the recesses 11, 12 or 13, 14. As a result, the bows are not able to rotate freely, but are deformed when a force is exerted on them by the lever-like actuating portions 25, 35 being actuated from the outside. The bows 21, 31 are pivoted about an approximate pivot axis which lies approximately in the region of the center between the two axes A1, A2 or A1', A2'. FIG. 2b shows the deflecting and twisting of the first gripper jaw 20 when the lever 25 is actuated. FIG. 2c shows the deflecting and twisting of the two gripper jaws 20, 30 when the two levers 25, 35 are actuated. When the fastening portions 25, 35 are released, the elastically deformed bows 21, 31 return back again into the defined starting position.

The bows 21, 31 do not have to be produced integrally but can also consist of several elements which are rigidly connected together. Said elements can also consist, for example, of different materials.

FIGS. 3a-e show a variant of the gripper from FIGS. 1a-d and FIGS. 2a-c where the actuating portions are situated on opposite sides of the gripper body 10. The bows 21, 31 and the gripper body 10 are otherwise identical in design and function. The gripper body 10 can be made of many parts (FIG. 3e). FIG. 3d shows a view from above onto the clamping regions 22, 32 of the bows 21, 31.

Figure 4:
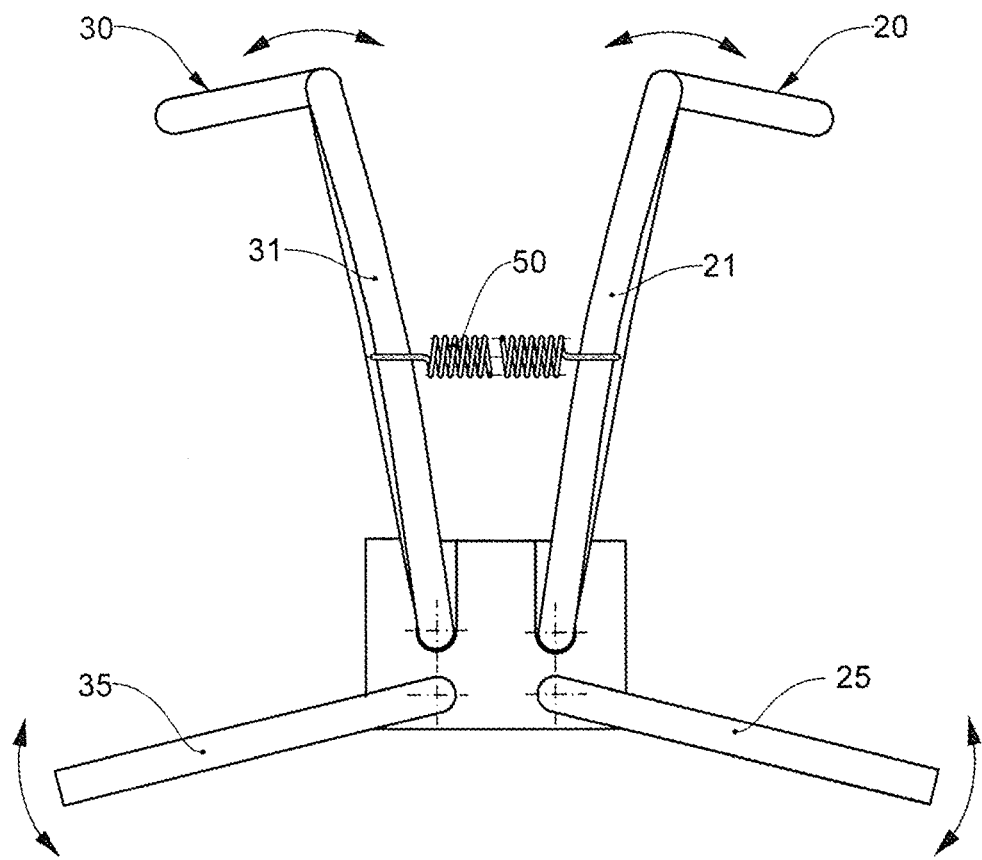
FIG. 4 is an elevation view that shows a gripper with gripper jaws which are prestressed inwards.

FIG. 4 shows a gripper 10 as in FIG. 1a-d where the bows 21, 31 are prestressed in relation to one another by means of an additional prestressing element 50, in this case a spring element.

Figure 5:
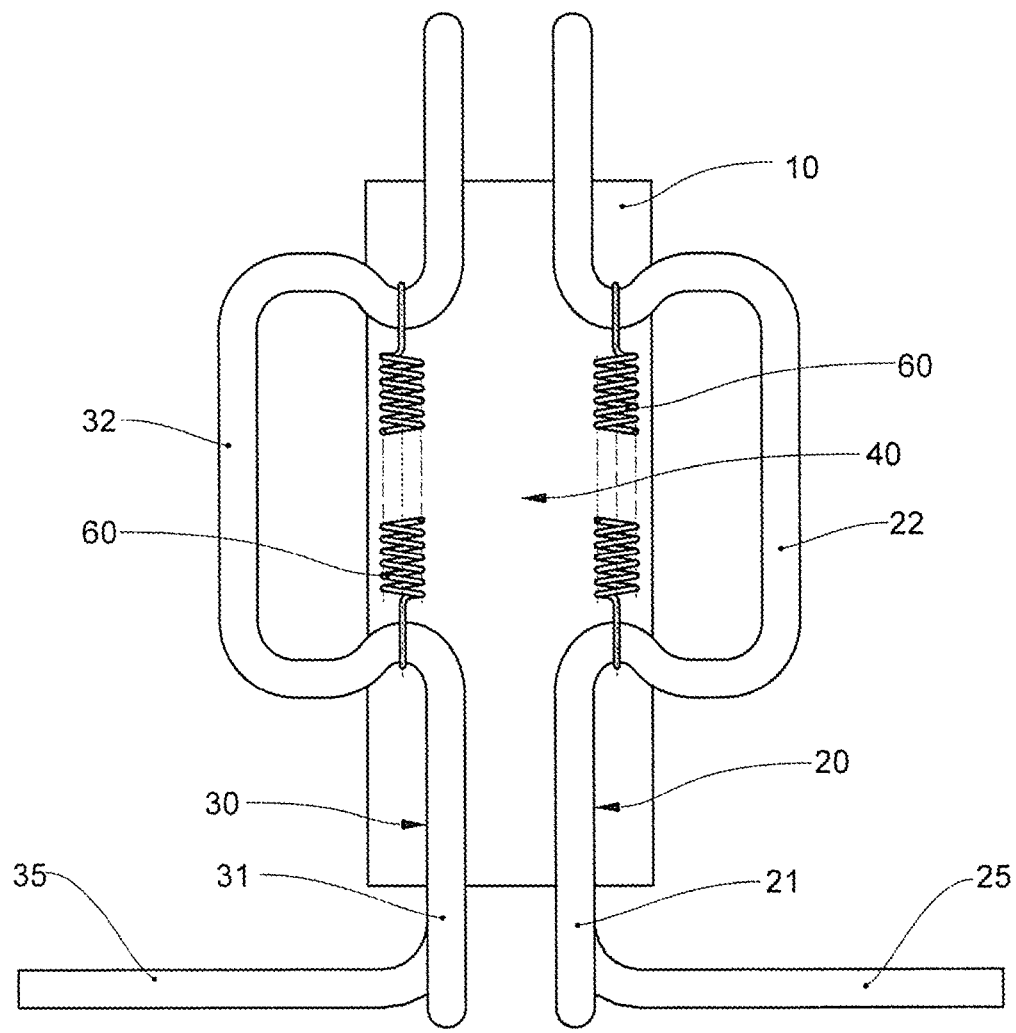
FIG. 5 is a plan view that shows a gripper with additional elastic clamping elements in the clamping region.

FIG. 5 shows a further gripper in a view from above onto the clamping regions 22, 32 of the bows 21, 31. The clamping regions 22, 32 are curved in a U-shaped manner. Between the two legs of the U there is a clamping element 60 which has a greater degree of elasticity than the bows 21, 31. It is, for example, a spring element or a rubber element. The two clamping elements 60 serve for the purpose of making it possible for the gripper 1 to adapt better to different circumferences and forms of the objects to be received and to be able to hold the object in a more reliable manner. The receiving means 40 is large enough for the springs to be able to deflect outwardly. By developing the surface of the clamping element 60 in a suitable manner, the objects can also be grasped in a friction-fitting manner.

Figure 6A:
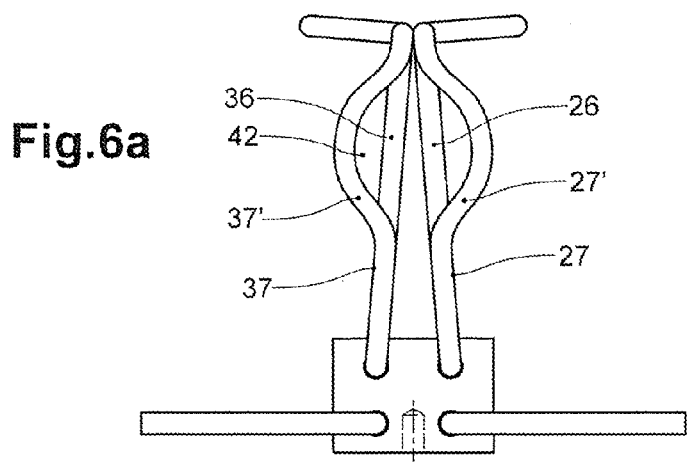
FIGS. 6a-6d are elevations views that show a further alternative gripper with two gripper jaws in the form of bows and various snapshots of said gripper when receiving objects.
Figure 6B:
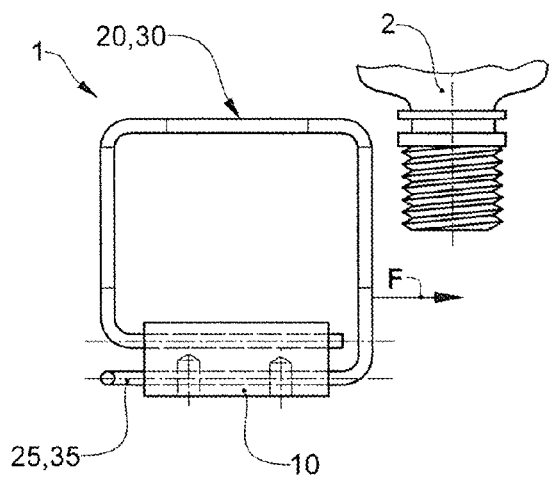
Figure 6C:
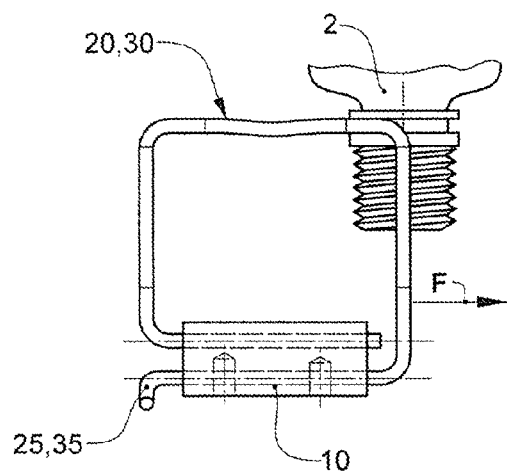
Figure 6D:
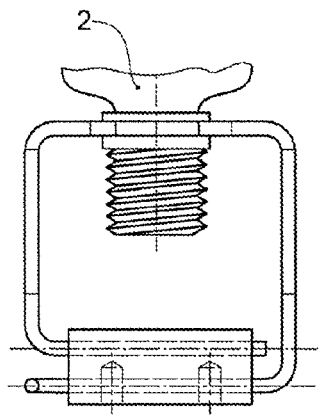

FIGS. 6a-d show a variant of the gripper from FIGS. 1a-d with an automatic opening function. One of the lateral portions 27, 37 of the bow 21, 31 is curved in a U-shaped manner in regions such that a recess 42 is formed between the portions 27, 37. Said U-shaped portions serve as an actuating element 27', 37' for the at least partial opening of the gripper 1 by means of an object to be received when the gripper is moved against the object 2 (FIG. 6b) from the side, i.e. in FIG. 6a at right angles to the image plane and in FIGS. 6b-d in the conveying direction F. The object 2 which is approached from the side presses the two legs 27, 37 apart from one another (FIG. 6c). As a result, the gripper 1 is somewhat opened such that the object moves into the receiving means 40 in the clamping region and is received between the gripper jaws when they snap back (FIG. 6d). The actuating portions 25, 35 are not moved by a control link but only indirectly by means of the bow 21, 31.

FIGS. 7a-b show a gripper 1 when discharging an object 2 by selectively opening the first or the second gripper jaw 20, 30 by means of a first or second control link 72, 74. If the left-hand gripper jaw 30 is activated, it is deflected downward to the left. The object 2 then falls to the left (FIG. 7a). When the right-hand gripper jaw is opened, the object falls correspondingly to the right (FIG. 7b). A direction-controlled discharge and consequently, for example, a sorting function can be achieved in this manner.

FIGS. 7a-7b also show the bearing arrangement of the gripper 1 on a drive member 82 of a conveyor system 80. The drive member 82, in this case, is a chain which is moved, in particular, in a continuous manner, the movement path thereof being established by means of a channel 84. The conveying direction is at right angles to the image plane. The chain 82 includes several chain links, each one of which or every second one of which, for example, serving as support for the gripper 1.

FIG. 8 shows a conveyor system 80 as claimed in the invention with a drive member 82, in this case a chain which is movable along a closed circular path U. A plurality of grippers 1 are coupled to the drive member 82. There are also control links 72, 74 present which interact with the control elements 25, 35 such that the grippers 1 are opened at an opening position S. By actuating the first control elements 25, the gripper jaws 20 on the right in the conveying direction F are opened and by actuating the second control elements 35 the gripper jaws 30 on the left in the conveying direction F are opened. The control links 72, 74 are preferably switchable such that the one or the other or the two can be activated in a selective manner in order to discharge the object 2 as shown in FIGS. 7a-b to different processing paths.

Figure 9:
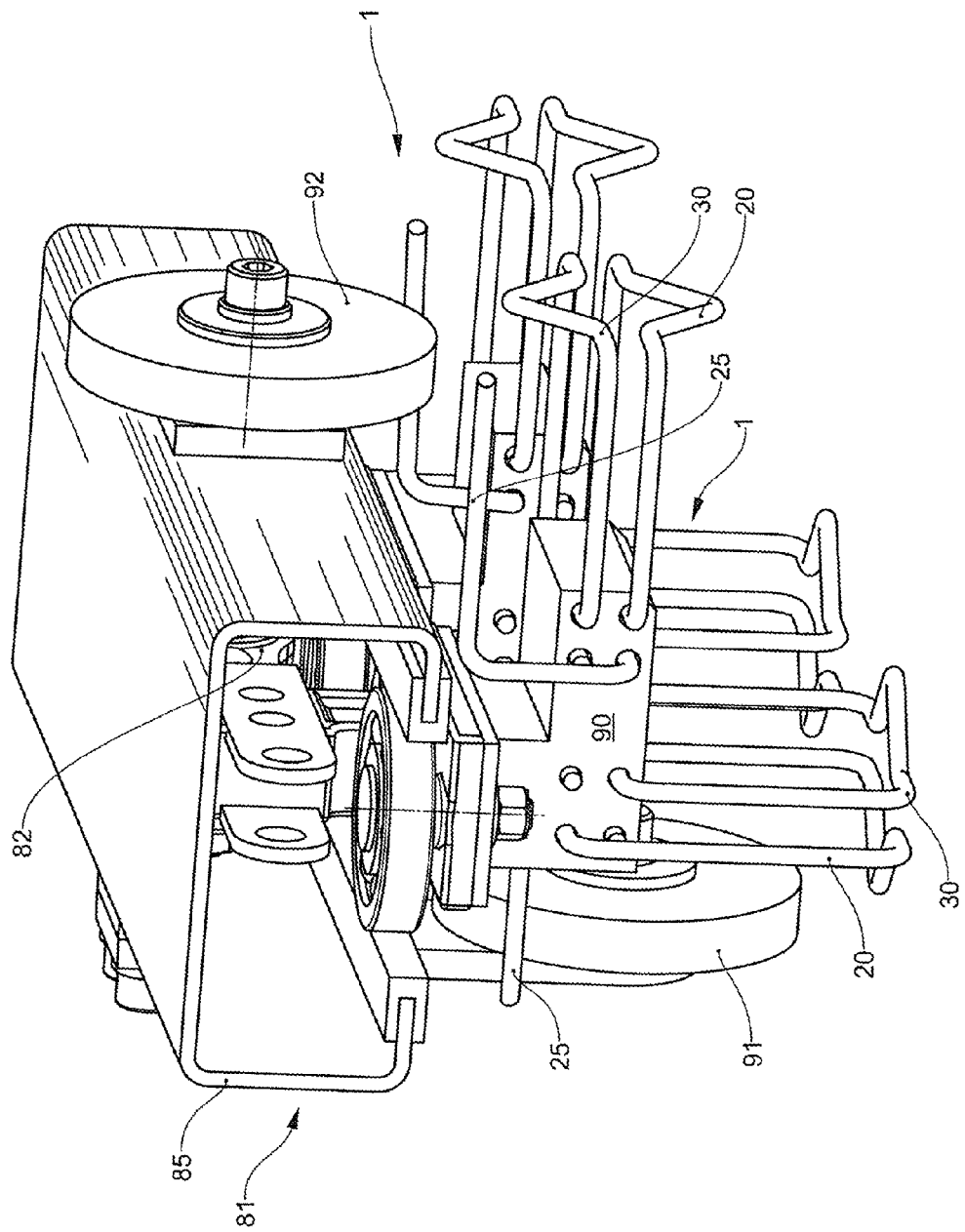
FIG. 9 is a perspective view that shows a detail of a conveyor system with grippers with two pairs of grippers.

FIG. 9 shows a perspective view of a detail of a conveyor system 81 which includes grippers 1 with two pairs of grippers. Two grippers 1 which are fastened on the drive member 82 are shown in FIG. 9. The drive member 82 is a chain and is moved inside a channel which is realized, in this case, as a guide channel 85. The chain 82 includes several chain links, every one of which or every other one of which, for example, serves as support for the gripper 1. A gripper 1 comprises, in this case, an L-shaped gripper body 90 with one long leg and one short leg which stands at right angles thereto. An end face of the short leg of the L-shaped gripper body 90 is fastened on the drive member 82.

A first pair of grippers is arranged at one position of the gripper body 90 which is opposite the end face of the short leg of the gripper body 90. The first pair of grippers is assembled from a first gripper jaw 20 and a second gripper jaw 30. The gripper jaws 20, 30 are structurally identical to the gripper jaws of the gripper 1 in FIG. 1 and are connected to the gripper body 90 in this same way (i.e. mounted in recesses of the gripper body 90). The first gripper jaw 20 has an actuating portion 25. In the closed state shown in FIG. 9, the first pair of gripper jaws extends or points in the direction of a longitudinal axis of the short leg of the gripper body 90. In other words, a longitudinal axis of an object 2 which is grasped by the first pair of gripper jaws points, for example, in the direction of the longitudinal axis of the short leg of the gripper body 90.

A second pair of grippers is arranged on an end face of the long leg of the gripper body 90. The second pair of grippers is structurally identical to the first pair of grippers and is also assembled from a first gripper jaw 20 and a second gripper jaw 30. In this case too the first gripper jaw 20 comprises an actuating portion 25. In the closed state shown in FIG. 9, the second pair of gripper jaws extends or points in the direction of a longitudinal axis of the long leg of the gripper body 90. In other words, a longitudinal axis of an object 2 which is grasped by the second pair of gripper jaws points in the direction of the longitudinal axis of the long leg of the gripper body 90. Consequently, in the closed state the second pair of gripper jaws is at right angles to the first pair of gripper jaws.

A first control link 91 and a second control link 92 are fastened, for example, on the guide channel 85 of the conveyor system 81. FIG. 9 shows the conveyor system 82 at an opening position S as the gripper 1 is able to be opened by means of the control links 91, 92. The first control link 91 is arranged in such as manner that it is able to interact with the actuating portion 25 of the first pair of gripper jaws. The second control link 92 is arranged in such as manner that it is able to interact with the actuating portion 25 of the second pair of gripper jaws. The first control link 91 and the second control link 92 are both structurally identical and are realized as rotatably-mounted discs, the radially outside side of which (that is the circumferential side of the discs) interacts, where applicable, with the actuating portions 25.

In FIG. 9, the first and second control links 91 and 92 respectively are fastened in such a manner on the guide channel 85 in a release position that they always interact with all the actuating portions 25 moved past them when the drive member 82 is moved through said guide channel 85. This means that the control links 91, 92 interact with all the actuating portions 25 which are present on grippers 1 which are fastened on said drive member 82 when said fastening portions 25 are moved past the control links 91 or 92 respectively caused by the movement of said drive member 82.

As an alternative to this, the control links 91, 92 can also be fastened in such a manner on the guide channel 85 that the control links assume the above-described release position only sometimes and sometimes assume a non-release position in which the control links 91, 92 do not interact with the actuating portions which are moved past. Interaction between the control links 91, 92 and the actuating portions 25 which are moved past can be switched on and off in this manner. The control links 91, 92 can be activated and deactivated for example, by means of a control device.

Figure 10:
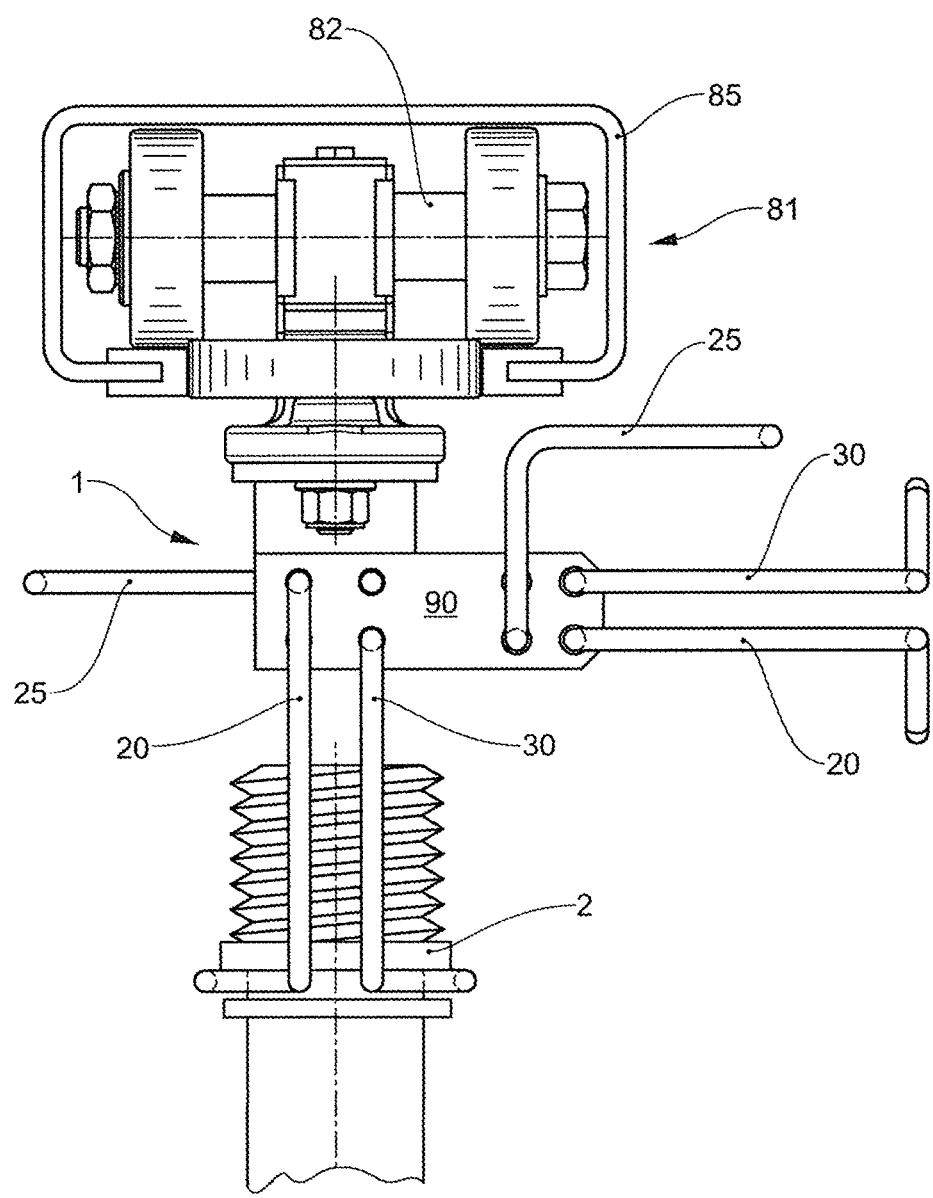
FIG. 10 is an elevation view that shows a first cross section through the conveyor system from FIG. 9.
Figure 11:
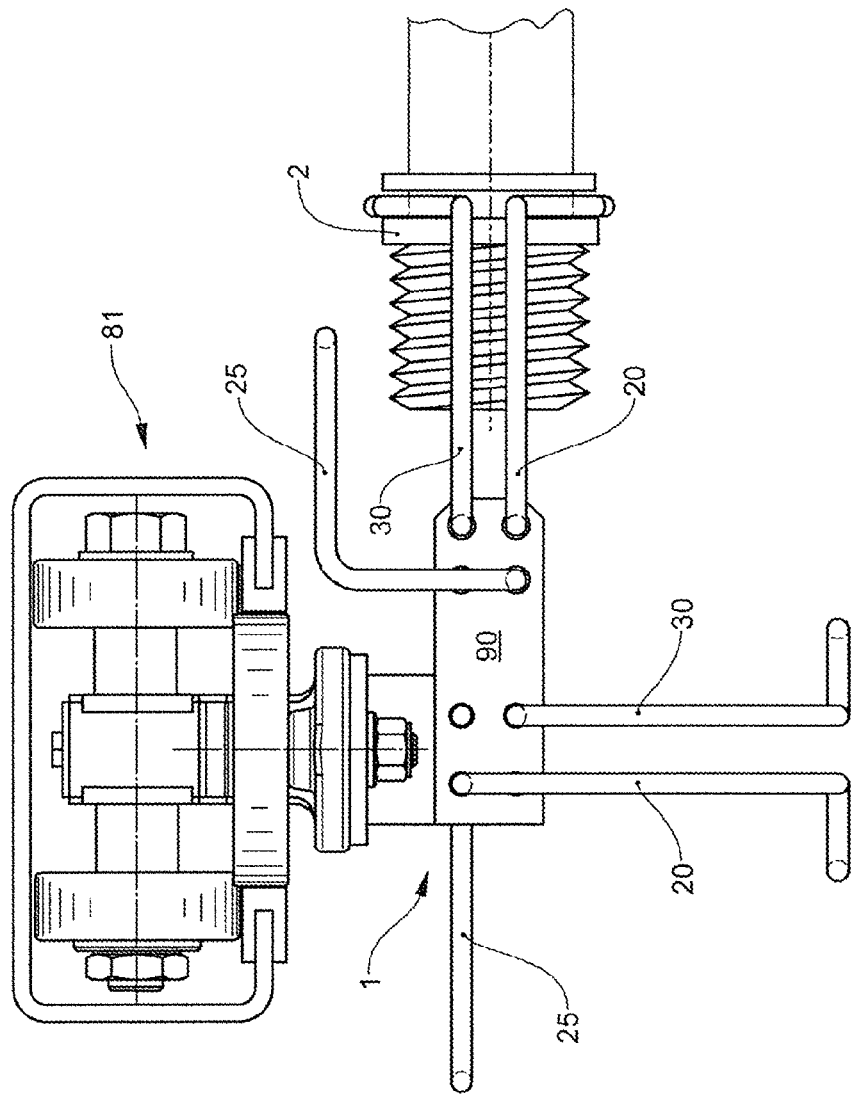
FIG. 11 is an elevation view that shows a second cross section through the conveyor system from FIG. 9.

FIG. 10 and FIG. 11 both show a cross section through the conveyor system 81 already shown in FIG. 9. FIG. 10 shows a first cross section in which an object 2 is grasped by the first pair of gripper jaws of the gripper 1. The longitudinal axis of the object 2 which is grasped by the first pair of gripper jaws points in the direction of the longitudinal of the short leg of the gripper body 90. The longitudinal axis of the object 2 which is grasped by the first pair of gripper jaws, in this case, stands at right angles to the direction of the longitudinal axis of the long leg of the gripper body 90.

FIG. 11 shows a second cross section in which an object 2 is grasped by the second pair of gripper jaws. The longitudinal axis of the object 2 which is grasped by the second pair of gripper jaws of the gripper 1 points in the direction of the longitudinal of the long leg of the gripper body 90. The longitudinal axis of the object 2 which is grasped by the second pair of gripper jaws, in this case, stands at right angles to the direction of the longitudinal axis of the short leg of the gripper body 90. Consequently, the longitudinal axis of the object 2 which is grasped by the second pair of gripper jaws stands at right angles to the direction of the longitudinal axis of an object 2 which is grasped by the first pair of gripper jaws.

In the embodiments shown, the longitudinal axis of a grasped object 2 extends in each case in the same direction in which the gripper jaws extend in each case, and respectively parallel to said direction. The statements concerning the direction with reference to the longitudinal axis of a grasped object 2 therefore also apply with reference to the directions in which the gripper jaws extend.

FIG. 12 shows a top view of part of the circular path U' of the conveyor system 81 from FIG. 9. The conveying direction F is marked and extends from right to left with a correspondingly opposing conveying direction F in the region of a loop in the circular path U'. The guide channel 85 (and consequently also the drive member 82 and the grippers 1 fastened thereon) is rotated during the course of the loop of the circular path U' by 90 degrees about a rotational axis which stands parallel to the conveying direction F. A region of the circular path U' after the start of the loop and a region of the circular path U' prior to the end of the loop extend parallel to one another. Said regions define a transferring zone W. A closed loop conveyor 95 is arranged in the transferring zone W between the regions of the circular path U' which extend in parallel and parallel thereto.

As shown schematically in FIG. 12 by the orientation of the cross sections of the channels 85 shown, the gripper 1 enters the transferring zone W for the first time (for a first run through) in the conveying direction F from the right-hand edge of FIG. 12 when the first pair of grippers of the gripper 1 lies in the drawing plane of FIG. 12. Lying in the conveying direction behind the loop of the circular path U', the gripper 1 enters the transferring zone W for the second time (for a second run-through) in the conveying direction F from the right-hand edge of FIG. 12. The orientation of the gripper 1 remains unchanged when crossing or running through the transferring zone both for the first run-through and for the second run-through.

In the transferring zone W, an object 2 which is grasped by a second pair of gripper jaws of a gripper 1 is transferred into a first pair of gripper jaws of another gripper 1. The transferring of the object 2 can be effected, for example, by means of a transferring mechanism 93 in a transferring direction R (shown by an arrow with a blank tip), as shown for better representation not in FIG. 12, but in FIG. 13 in a cross section through the sectioned plane V marked in FIG. 12.

If an object 2 is grasped by a gripper 1 by means of the second pair of gripper jaws and is conveyed along the circular path U' in the conveying direction F, the object thus runs through the transferring zone W for a first time. The object 2 then runs through the loop of the circular path U' also for the first time. After this the object 2 runs through the transferring zone W for the second time and during said second run through of the transferring zone W is transferred from the second pair of gripper jaws of the gripper 1 in the transferring direction R into a first pair of gripper jaws of a further gripper 1, said further gripper 1 running through the transferring zone W for the first time. The object which is now grasped by the first pair of gripper jaws of the further gripper 1 then runs through the loop of the circular path U' for the second time and finally runs through the transferring zone W for a third time without, in this case, being transferred again into another gripper 1.

An object 2 which is conveyed by the conveyor system 81 runs through the loop of the circular path U' twice in this manner, whilst the grippers 1 run through the loop only once. The object 2 covers twice the path of the loop in the circular path U'. This can be utilized in a very advantageous manner for the purpose of, for instance, shortening or simplifying conveying systems. This saves costs, space and time (for instance during maintenance, retrofitting and/or cleaning). The loop, in this case, can assume an arbitrary shape or form. The length of the loops can also be varied.

For example, by transferring the conveyed object 2, a cooling section can be realized in a loop which is only half the length (that is in a loop with half the distance compared to a loop where transferring does not occur) without, at the same conveying speed, the length of the cooling operation being shortened in this connection. For example, however, a cleaning system can also be run through twice in order to apply the cleaning process twice without, however, needing two cleaning systems but just one cleaning system to do this. The same also applies to all other processes and applications which are to be applied multiple times to the object 2, for example, for instance irradiation with visible light, UV light, electromagnetic radiation on other wavelengths and other ionizing and/or non-ionizing radiation. Repeated heating and/or cooling or repeated coating, painting and/or varnishing can also be carried out, for example, in an advantageous manner by means of the conveyor system 81.

As an alternative to this, the circular path U' can be run through in a direction which is opposite to the marked conveying direction F. As an alternative to this, the transferring can also be effected in a transferring direction R* which is opposite to the transferring direction R (marked in the figures with an arrow with a solid tip). By conveying in opposition to the conveying direction F or by transferring in the transferring direction R*, an object 2 which is grasped by a second pair of gripper jaws of a gripper 1 is already transferred into a first pair of gripper jaws of a further gripper 1 during the first run through of the transferring zone W. As said further gripper 1 has already run through the loop of the circular path U', the object 2 grasped by it does not run through the loop at all. The loop of the circular path U' is therefore jumped by the object 2 or in other words is passed over or bridged. This can, for example, serve for repositioning the object 2 in relation to the grippers 1 of the conveyor system 81 or for grasping the object 2 differently. Thus, for example, an object 2 can be grasped by a gripper 1 in a horizontally aligned manner, transferred to a further (rotated) gripper 1 and after the further gripper 1 has been rotated back is conveyed further in a vertically aligned manner.

As an option, the transferring mechanism 93 can be realized in such a manner that it is able to transfer objects 2 both in the transferring direction R and also in the opposite transferring direction R*.

With reference to the flow of the conveyed objects 2, a transferring mechanism 93 provides a switch which, depending on the realization and transferring direction R or R* allows for conveyed objects 2, during a one-time run through of the closed circular path of the conveyor system, to leave out or jump certain parts or portions of said closed circular path of the conveyor system or to run through said parts or portions twice or more often or only to run through said parts or portion of the circular path precisely only once (the transferring mechanism 93 for example not transferring the object 2 in the last case).

As an option, several transferring mechanisms 93 can also be arranged in one transferring zone W. Conveyed objects 2 can also run through, for example, certain parts or portions of a closed circular path of the conveyor system three times or more by being transferred two times or more in the transferring zone W.

FIG. 13 shows a cross section through the circular path U' of the conveyor system 81 from FIG. 12. The cross section, in this case, extends in the transferring zone W along the sectional plane V-V marked in FIG. 12. FIG. 13 shows the transferring mechanism 93. The transferring mechanism 93 includes a closed loop conveyor 95 and transferring elements 94 which are moved along the closed loop conveyor 95. The transferring elements 94 are moved during the transfer along the closed loop conveyor 95 at the same speed in the same direction as the grippers 1 along the closed circular path U'. On the left-hand side of FIG. 13, a transferring element 94 grasps an object 2 which is initially grasped by a second pair of gripper jaws of a gripper 1. Said gripper 1 then releases the object 2, and the transferring element 94 or the transferring mechanism 93 pivots the object 2 in the transferring direction R to a further gripper 1. Said further gripper 1 grasps the object 2 by way of its first pair of gripper jaws. Depending on how the system is operated, on the left-hand side, the first pair of gripper jaws can also hold a further object 2, or on the right-hand side, the second pair of gripper jaws can also hold a further object 2 (not shown).

The position of a grasped object 2 with reference to the gripper 1 can also be important, for example, for specific processing and in particular for certain processing stations. This is the case, for example, with different orientations for different production and/or processing steps, for example for production in a vertical position and processing in a horizontal position. By transferring the grasped object 2 from one gripper 1 into a further gripper 1 of the same circular path U', the grasped object 2 changing its position with reference to the respective gripper 1, for example access to the required object 2 or processing of the same is made easier or even made possible at all.

The grippers 1 of FIGS. 1-7, 9-11 or the generalizations thereof and/or individual features and/or component parts of said grippers 1 or of the generalizations thereof can be combined with conveyor systems 80, 81 of FIGS. 8 and 12-13 or the generalizations thereof and/or individual features and/or component parts of said conveyor systems 80, 81.

The grippers 1 of FIGS. 1-7, 9-11 or the generalizations thereof and/or individual features and/or component parts of said grippers 1 or the generalizations thereof can also be combined with one another. The conveyor systems 80, 81 of FIGS. 8, 12-13 or the generalizations thereof and/or individual features and/or component parts of said conveyor systems 80, 81 can also be combined with one another.

The invention claimed is:

1. A gripper for grasping and conveying spatially extended, symmetrical objects, said gripper having a gripper body, a first gripper jaw and a second gripper jaw, each of said first and second gripper jaws comprising at least one clamping region and being able to assume an open and a closed state in relation to one another and being able to exert a clamping force onto the object to be grasped, and said gripper having at least one control element that is adapted to interact with a control link so as to move said first and second gripper jaws between the open and closed states, said at least one control element being part of the gripper and being moved together with the gripper in a conveying direction whereas the control link is stationary and positioned so that the at least one control element is moved into engagement with the control link, and applies a force to the at least one control element, as the gripper and the at least one control element are moved in the conveying direction, wherein at least one of the gripper jaws includes a jaw body that is elastically deformable and is mounted on the gripper body such that, when the control element is out of engagement with the control link, the gripper jaws assume a defined spatial position and, when the control element is in engagement with the control link, the gripper jaws deform and are thereby deflected out of the defined spatial position.

2. The gripper as claimed in claim 1, wherein the jaw body is mounted on the gripper body at at least three points, which do not lie along one common axis, or at at least two different axes.

3. The gripper as claimed in claim 1, wherein the jaw body comprises portions which are loaded with torsion and flexion when force acts on the control element and/or when an object is held.

4. The gripper as claimed in claim 1, wherein the jaw body consists at least in part of an elastically deformable material.

5. The gripper as claimed in claim 1, wherein the jaw body is of one part or multiple parts.

6. The gripper as claimed in claim 1, wherein the jaw body comprises at least two fastening portions that are spaced apart from one another, between which the clamping region is located and by way of which the jaw body is mounted in or on bearing regions of the gripping body, wherein the bearing regions and consequently the fastening portions are aligned in the gripper body along different axes.

7. The gripper as claimed in claim 1, wherein the jaw body is a bow made of a wire-shaped or tubular material.

8. The gripper as claimed in claim 7, wherein the bow forms a loop that lies substantially in one plane.

9. The gripper as claimed in claim 1, wherein, in a lateral region, the jaw body comprises an actuating portion that functions directly as the control element or is coupled with a separate control element.

10. The gripper as claimed in claim 9, wherein a fastening portion adjoins the actuating portion, by way of which the jaw body is mounted in the gripper body, and in that the actuating portion is bent in relation to the fastening portion.

11. The gripper as claimed in claim 1, wherein the clamping region is formed such that, in the closed state together with the further gripper jaw, a receiving device with a defined minimum size is formed.

12. The gripper as claimed in claim 11, wherein the clamping region is adaptable to different forms and sizes of the objects to be received by said clamping region by way of comprising elastically deformable clamping elements that have a degree of elasticity that is greater than a degree of elasticity of the jaw body and that, in use, surround the object.

13. The gripper as claimed in claim 12, wherein, for adapting additionally to the objects to be received, the clamping elements are exchangeable.

14. The gripper as claimed in claim 1, comprising two substantially identically constructed gripper jaws that are individually controllable.

15. The gripper as claimed in claim 1, comprising two substantially identically constructed gripper jaws that are prestressed toward one another or outwards.

16. The gripper as claimed in claim 1, wherein the gripper jaws comprise further actuating elements for realizing an automatic opening function or are coupled with such further actuating elements, wherein the gripper jaws are moved apart from one another when an object to be received presses against the further actuating elements.

17. The gripper as claimed in claim 1, wherein the gripper comprises at least two first gripper jaws and at least two second gripper jaws, wherein each first gripper jaw is able to assume an open and a closed state in relation to at least one second gripper jaw and is able to exert a clamping force onto the object to be grasped and/or also in reverse each second gripper jaw is able to assume an open and a closed state in relation to at least one first gripper jaw and is able to exert a clamping force onto the object to be grasped.

18. The gripper as claimed in claim 17, wherein each first gripper jaw is able to assume an open and a closed state in relation to one single second gripper jaw and is able to exert a clamping force onto the object to be grasped, and in that also each second gripper jaw is able to assume an open and a closed state in relation to one single first gripper jaw and is able to exert a clamping force onto the object to be grasped.

19. The gripper as claimed in claim 17, wherein several first gripper jaws are deflected by one common control element and/or several second gripper jaws are deflected by one different, common control element, and wherein the gripper comprises a number of control elements that is greater than or equal to the number of the first gripper jaws and/or greater than or equal to the number of second gripper jaws.

20. The gripper as claimed in claim 17, wherein, in the closed state, a first pair of gripper jaws is at an angle of between 40 and 140 degrees, in particular of between 60 and 120 degrees and in particular of between 80 and 100 degrees with respect to a second pair of gripper jaws, wherein one pair of gripper jaws includes a first gripper jaw and a second gripper jaw that are able to exert a clamping force onto the object to be grasped.

21. A conveyor system having a drive member which is movable along a closed circular path and a plurality of grippers as claimed in claim 1 that are configured to be coupled to the drive member.

22. The conveyor system as claimed in claim 21, said conveyor system including a transferring mechanism that is able to transfer a grasped object from a first gripper of the conveyor system into a second gripper of the conveyor system, wherein in particular the grasped object is transferred out of a first position with reference to the first gripper into a second position with reference to the second gripper and the first and the second position differ with reference to the respective gripper in contact points with the gripper, in the position of the object with reference to the gripper and/or in the orientation of the object with reference to the gripper.

23. The conveyor system as claimed in claim 21, said conveyor system having a plurality of grippers that comprise one single controllable first gripper jaw and one substantially identically constructed second gripper jaw and first and second control elements that are associated therewith, and having first and second control links that interact with the first or second control elements for the targeted opening of the first and/or second gripper jaw.

24. The conveyor system as claimed in claim 23, comprising an opening position at which a first and a second control link are arranged, wherein the control links are able to be activated and deactivated by a control device in order to open the first and/or the second gripper jaw in a selective manner.

25. A method for operating a conveyor system having the features of claim 24, wherein the first and/or the second control link is activated in a selective manner at the opening position and as a result the first and/or second gripper jaw is moved in a selective manner, and wherein, as a result, objects grasped by the grippers are discharged in different directions at the opening position and are supplied to different further conveying paths and/or processing stations and/or collecting positions.

26. The method for operating a conveyor system having the features of claim 21, wherein, in a first step, an object to be grasped is grasped by a first gripper of the conveyor system, in a second step the grasped object is transferred from the first gripper of the conveyor system to a second gripper of the conveyor system and in a third step the grasped object is discharged from the second gripper of the conveyor system.

27. The method for operating a conveyor system according to claim 26, wherein, in the second step, the grasped object is transferred from a first position with reference to the first gripper into a second position with reference to the second gripper and the first and the second position with reference to the respective gripper differ in contact points with the gripper and/or in the position of the object with reference to the gripper and /or in the orientation of the object with reference to the gripper.

28. The method for operating a conveyor system according to claim 26, wherein an object grasped after the second step of the method runs through, at least in part, an identical portion of the closed circular path of the conveyor system as the object grasped prior to the second step of the method.

* * * * *